United States Patent [19]

Samples

[11] 3,875,558

[45] Apr. 1, 1975

[54] METHOD OF MAKING A HEAT DETECTING TIRE, A HEAT DETECTING TIRE, AND OPERATIVE TIRE HEAT DETECTING SYSTEM

[76] Inventor: Charles R. Samples, 774 Wild Cherry Dr., Akron, Ohio 44319

[22] Filed: May 31, 1974

[21] Appl. No.: 474,910

[52] U.S. Cl. .................. 340/58, 340/57, 73/146.2, 200/61.22
[51] Int. Cl. ............................................ B60c 23/00
[58] Field of Search ........ 340/57, 58, 227 R, 228 R, 340/239 R; 200/61.22, 61.23; 73/45.6, 45.7, 49, 146, 146.2; 116/34

[56] References Cited
UNITED STATES PATENTS
2,033,424   3/1936   Grieskieng ................... 73/146.2 X
3,568,145   3/1971   Dikoff ............................. 340/58
3,593,269   7/1971   Richardson ..................... 340/58

*Primary Examiner*—Alvin H. Waring
*Attorney, Agent, or Firm*—Oldham & Oldham Co.

[57] ABSTRACT

A method of making a heat detecting tire including applying or forming a coating of a heat sensitive electrically conductive plastic material adapted to melt or deform at about 250° F. to 300° F. over the entire inner surface of the tire and one bead area of the tire except for a narrow circumferentially extending band at a radially outer portion of the tire and providing electric circuit conductive means connecting to the wheel on which the tire is mounted and thus to said one bead area and also to an opposite annular band of the material in the tire for completion of a circuit through the tire when the tire is heated to excessive operating temperatures for sensing approaching blowout conditions and providing a warning thereof. Also, means are provided for detecting under inflation of a tire and warning the driver to prevent tire destruction from under inflation.

12 Claims, 7 Drawing Figures

METHOD OF MAKING A HEAT DETECTING TIRE, A HEAT DETECTING TIRE, AND OPERATIVE TIRE HEAT DETECTING SYSTEM

This invention relates to heat detecting systems including a pneumatic tire and the mounting means therefor and to a tire for use in a heat detecting system and including a heat sensitive material coating selected portions of the tire inner surface.

BACKGROUND OF INVENTION

It is well known that pneumatic tires, when they have blowouts therein, normally have been heated to relatively high operating temperatures. Thus, various efforts have been made heretofore to sense the temperatures in operating tires and to endeavor to provide warning systems to the driver showing the excessive heat build up in a tire.

Certain prior art patents in this field include U.S. Pat. Nos. 3,491,335; 3,453,404 and 2,756,297.

None of the prior art patents have achieved any satisfactory commercial success, to my knowledge, and a practical, low cost but positive acting heat detector system for pneumatic tires is still a requirement in the tire and vehicle art.

The general object of the present invention is to provide a new and improved pneumatic tire particularly adapted for use in a heat detecting system including the pneumatic tire and wherein the tire of the invention will have its interior surface altered when excessive temperatures are established or are being approached in the tire.

Another object of the invention is to provide an electric circuit in combination with a pneumatic tire and wherein the circuit includes a conductive heat sensitive layer formed on the inside surface of the tire but having a circumferentially extending interruption in such conductive layer.

Another object of the invention is to provide a heat sensitive conducting layer in a tire which layer will melt before normal blow out temperatures are reached in a tire approaching blow out conditions.

Further objects of the invention are to provide a practical, sturdy, dependable low cost and efficient system for detecting and warning a vehicle occupant when a pneumatic tire has excessive temperatures set up therein; to detect under inflation before tire damage by heat build up occurs; and to provide a reusable heat detection means in a tire.

The foregoing and other objects and advantages of the invention will be made more apparent as the specification proceeds.

Reference now is particularly directed to the accompanying drawings, wherein.

When referring to corresponding members shown in the drawings and referred to in the specification, corresponding numerals are used to facilitate comparison therebetween.

SUBJECT MATTER OF THE INVENTION

Figure 1:
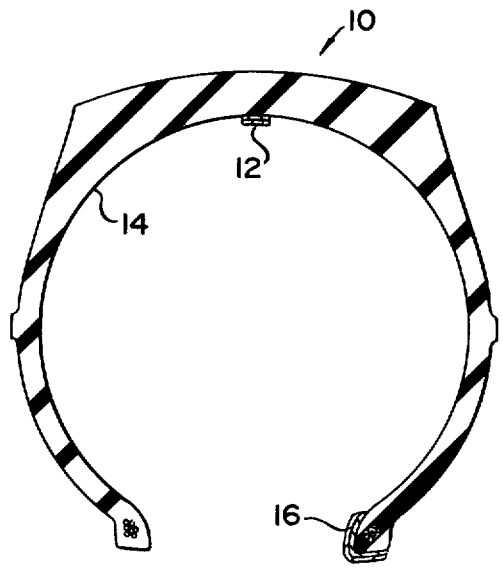
FIG. 1 is a sectional view of a tire prepared in accordance with the present invention for deposit of an electrically conductive layer thereon.
Figure 2:
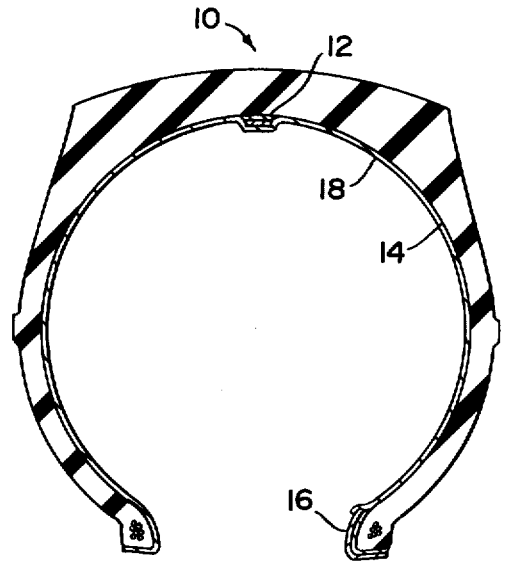
FIG. 2 shows the tire of FIG. 1 with a heat sensitive layer deposited thereon.

This invention particularly relates to a tire heat detecting system, and to the tire used therein, and wherein the tire has two radially spaced annular bands of heat sensitive conductive material forming a thin coating over the inner surface of the tire and connecting to one bead thereof and wherein an electrically conductive warning system is conducted to a wheel on which the tire is mounted and to the second annular band of conductive material not connecting to the wheel whereby when the tire is subjected to excessive heat conditions, the heat sensitive layer on the inner surface of the tire will melt and flow between the radially spaced annular bands of material on the tire to complete a circuit for actuating the warning device. Any suitable electrically conductive heat sensitive material can be used for forming the conductive layers on the tire, which layer should melt at a temperature in the vicinity of about 250° F. to about 300° F.

Reference now is particularly made to the details of the structure as shown in the accompanying drawings, and a pneumatic tire 10 is shown, which tire is of substantially conventional construction and preferably is of the tubeless type. The tire 10, when started to be processed in accordance with the invention, has some type of a removable member or band such as a strip of masking tape 12 secured to the inner surface 14 of the tire and extending as an annular band circumferentially of the tire at a radially outer portion thereof as indicated in the drawings. The tire 10 also has a second removable strip 16 of masking tape secured to one bead area of the tire and extending the circumference of the tire at such bead area of the tire. These removable strips 12 and 16 are of conventional composition and they may be made from paper, film, or a metal strip having a layer of pressure sensitive adhesive on one surface thereof but with the strips 12 and 16 both being in removable engagement with the tire 10 for a purpose to be described hereinafter. The strip 12 can be of any suitable width and it normally would be quite narrow such as from a few one one-hundredth inch in width up to about one-fourth inch maximum. Or, such strip 12 may be a cord or strand of cotton or other material that is suitably removably secured, as by any suitable adhesive material, to the inner surface of the tire.

Usually tires as made today have some type of a silicon release coat on the inner surfaces thereof. Hence, normally it is desirable to buff the inside of the tire to clean the release material therefrom, or the inside surface 14 of the tire could be solvent cleaned in a known manner.

After the tire has had the two removable strips applied thereto as shown in FIG. 1, then a thin liquid coating of an electrically conductive, heat sensitive material is applied over the entire inner surface of the tire and normally over both bead areas thereof. This composition is compounded to melt at relatively sharp temperatures, such as temperatures of approximately 250° –

300° F. In normal pneumatic tire use, when blowouts occur, usually the tire has developed heat in excess of 300° F. at which temperature blowouts occur. Sulfur used in vulcanization of the tire normally breaks down and releases its crosslinking action after a period of time at temperatures above 300° F. Hence, the material applied to the surface 14 of the tire, to complete an electrical circuit, must melt or approach its melting point at a temperature somewhat below 300° F. Usually the coating material is just applied as a liquid to the entire inner surface of the tire (including the beads) and then is air dried to coat the complete inner surface of the tire.

When the layer of coating material 18 has dried on the inner surface of the tire, then the strip 12 is removed to leave a circumferentially extending radially spacing gap 20 between annular bands or portions 18a and 18b formed by the layer 18 due to removal of the portion thereof which initially covered the strip 12. Likewise, the bead strip 16 on the tire is removed and this leaves a bead portion 22 that has no conductive material coating thereon.

Next in the process of forming a tire heat detecting system, the tire 10 is mounted upon any conventional type of a metal wheel 30. A portion of this metal wheel 30 is shown and it indicates that the conductive layer 18a extends over the radially inner edge of a bead area 24 of the tire which is in conductive engagement with such wheel. The wheel normally is electrically grounded in any conventional manner, as indicated at 32. Obviously, this wheel 32 would be secured to a vehicle and the wheel would be mounted on a conventional axle by wheel mounting means.

Figure 4:
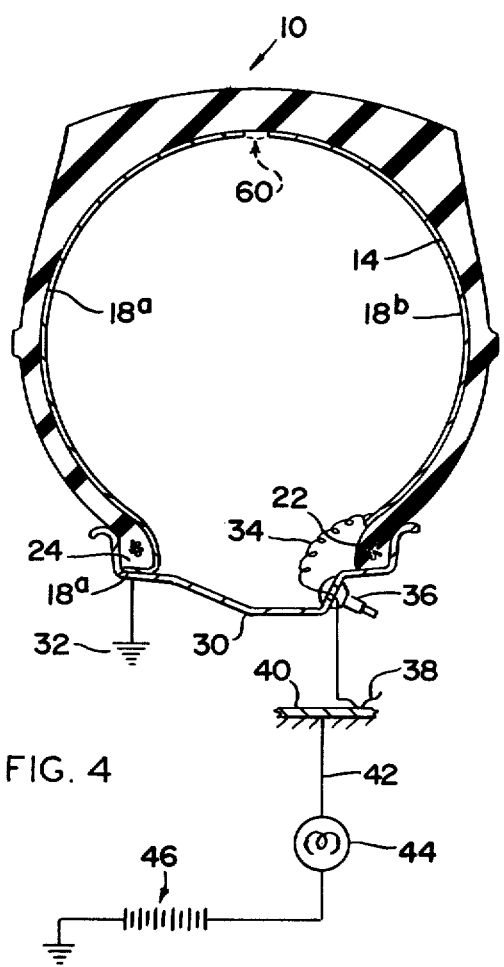
FIG. 4 is a vertical section of the tire mounted on a wheel and showing, diagrammatically associated therewith, an electrical control circuit for vehicle warning purposes.

In order to make the annular portion 18b of the conductive layer 18 be externally available for electrical circuit purposes, a suitable conductor such as a wire 34 is suitably secured to the annular conductive band or layer 18b or to the tire carcass in a conventional manner as by a bonding cement so that the wire contacts the conductive layer 18b. The wire 34 extends to a point externally of the wheel 30 without being in electrical contact with the wheel. For example, such wire 34 is shown to extend through a valve 36 that extends through a preformed hole in the wheel 30. The valve 36 normally has an appreciable volume of rubber therein and a hole is drilled therein for passage of the wire 34 therethrough to be insulated from the wheel. Such wire are completed. The contact 49 in turn connects to a wire 42 having a warning light 44 or a buzzer means connected therein so that a visual or audible warning can be provided for the vehicle driver when the electric circuit is intermittently completed to include the wire 42 and means connecting thereto. The wire 42 also connects to a battery 46 of the vehicle and with the opposite side of the battery connecting in turn to ground. Hence, an electrical circuit is completed that, as shown in FIG. 4, only has the interruption therein as indicated at 20 which interruption is formed between the annular 34 preferably terminates in or is formed from some suitable type of a metallic spring 38 that is suitably carried or mounted on the wheel in insulated relation thereto. Such wire or spring 38 will engage a fixed contact 40 mounted on the vehicle on which the wheel 30 is mounted whereby for each revolution of the wheel 30, the spring 38 will contact or engage the contact means 40 and permit electrical current to flow therebetween when circuit means connected thereto conductive bands 18a and 18b. FIG. 4 indicates that material from the layers 18a and 18b when melted can flow in as indicated at 60, to fill the gap between the annular bands 18a and 18b and complete a circuit around the radially inner surface of the tire 10. The rotating action of the tire 10 in use will facilitate such circuit completion action. Very high rotational forces, of course, exist on the coating material when the tire is in use. When the two layers 18a and 18b contact, then the warning device 44 would be actuated and an indication would be provided that the tire 10 has reached an unnatural or excessive heat condition normally being created by tire blowout conditions being approached in the tire.

Thus the driver of the vehicle, being warned, could stop the vehicle, inspect the tire, and decide whether the tire should be changed or other action taken to prevent the tire from blowing out.

The layer 18 can be made from any electrically conducted heat sensitive material of a conventional nature wherein such material had a relatively sharp melting point in the vicinity of about 250° to 300° F. Thus, for example, hydrocarbons having 20 carbon atoms in the chain thereof can be used as a carrier for a conductive carbon black to form one basic composition for forming the layer 18. Or, the basic carrier layer for the electrically conductive carbon black could be of a polymeric nature such as an isocyanate where a crosslinkage provided by the isocyanate breaks down at about 250° F. Thus an isocyanate or polyol of low molecular weight and which breaks down at from about 250° to 300° F. could be used. The material used to form the layer 18 must melt to provide a relatively thin, low viscosity liquid that readily will flow into the area as indicated at 60 to fill the gap in the conductive bands on the tire surface.

One typical composition from which the layer 18 has been formed is as follows:

| | | Range |
|---|---|---|
| 100 parts - | Paraffin wax with a melting point of 270° F. | 80 – 120 parts |
| 10 parts - | Tackifier resin specifically a terpene type resin Piccolite - S130 | 5 – 15 |
| 25 parts - | Carbon black such as XC-72 and including about 20 percent of conventional metal filings therein | 20 – 40 |

Solvent to adjust to suitable application viscosity.

The composition as indicated hereinabove can be made, melted and then be applied to the tire by a painting or spraying operation when heated to liquid form. The composition will air dry readily and provide a relatively thin coating of the conductive material on the inner surface of the tire. Should the deposit means for the coating be such as to localize the same, then the protective removable strip 16 may be omitted in the tire and the coating just be applied to the bead area 24 and the remaining portion of the tire inner surface but omitting the bead area 22.

The tire 10 would be mounted on the wheel 30 in a conventional manner but would have the wire 34 connecting to the conductive annular band 18b and be manually inserted through the hole provided in the valve stem 36. Any suitable means could secure the spring member 38 to the wheel 30 in insulated relation thereto but for rotation therewith for engaging the fixed contact 40 mounted on the vehicle frame.

Obviously the warning device 44 could be positioned on the vehicle dashboard, as desired.

The conductive layer provided within the tire can be very thin, such as about 0.005 to about 0.020 inch thick and any interruption or gap 20 in the layer can be of a relatively small lateral extent whereby the closing of a circuit between spaced portions of the conductive layer can readily be made under predetermined operative heat conditions.

In use of the tire of the invention, normally after an overheated condition has been set up, the tire would be removed from its rim for inspection and repair. At that time, one could take a sharp instrument and cut off or pull or force away any portion of the heat sensitive material in the layers 18a and 18b that has melted and run into contact with the other layer over the original gap 20 therebetween. Then the tire would again be set for further heat or blow out warning action.

Figure 3:
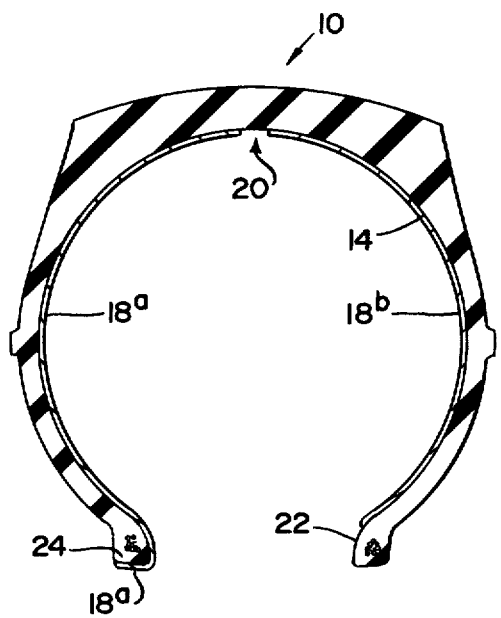
FIG. 3 shows a section of the tire as prepared for use and where an interruption is provided in the conductive layer on the tire of FIG. 2.
Figure 5:
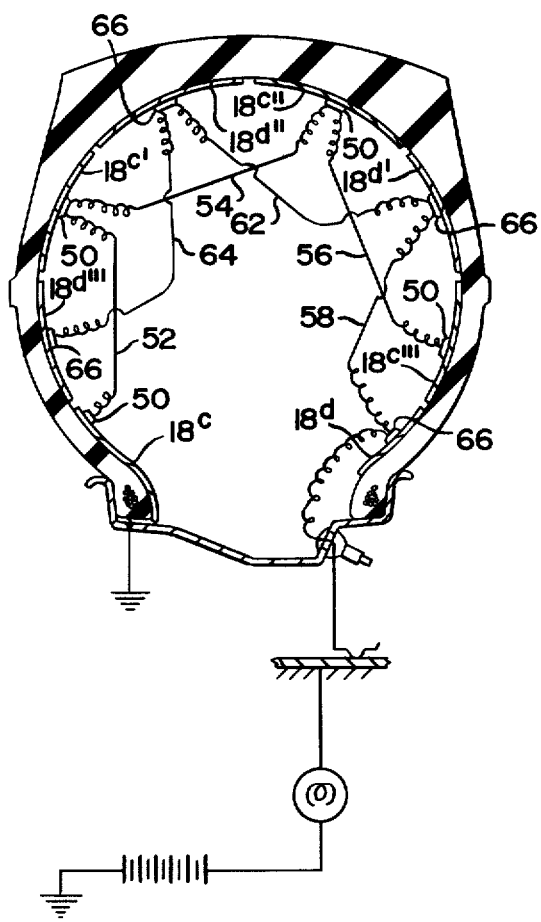
FIG. 5 is a tire section and circuit means, like FIG. 4, but of a modification of the invention.

A modified construction of the invention is shown in FIG. 5, wherein rather than just two circumferentially extending layers 18a and 18b as shown in FIG. 3 being provided, a plurality of pairs of such radially spaced layers or annular strips of conductive material are formed in the tire. Hence, FIG. 5 shows that a conductive layer 18c is provided in contact with and covering one bead area of the tire and it connects in turn to other continuous annular bands or rings of the conductive layer formed in the tire but with the individual rings all being radially spaced from each other. Thus, corresponding rings 18c', 18c'' and 18c''' are provided as shown in the drawing and with suitable connecting members 50 usually being provided in these layers 18c, etc. and with suitable conductors 52, 54 and 56 being connected to the conductive means 50 affixed to the tire wall and looping over the adjacent conductive section but with all four bands of the conductive material being connected to form one side of an electrical circuit. The opposite side of such electrical circuit is formed by members or layers 18d, 18d', 18d'' and 18d''', which members are in turn connected to each other by wires 58, 62 and 64 connected to conductive and/or adhesive means 66 suitably carried by the individual bands or sections of the conductive material for forming a unitary electrical connection therebetween. Hence, by the use of the construction shown in FIG. 5, even if a localized area of the tire for example of only about one inch in width or in circumference would be formed in the tire side wall or tread portion thereof, still one area of the conductive layers in the tire will be sufficiently heated by the heat breakdown action starting in the tire so that a warning signal would be provided by the closing of a contact between any two adjacent but electrically independent areas or layer portions in the tire.

Figure 6:
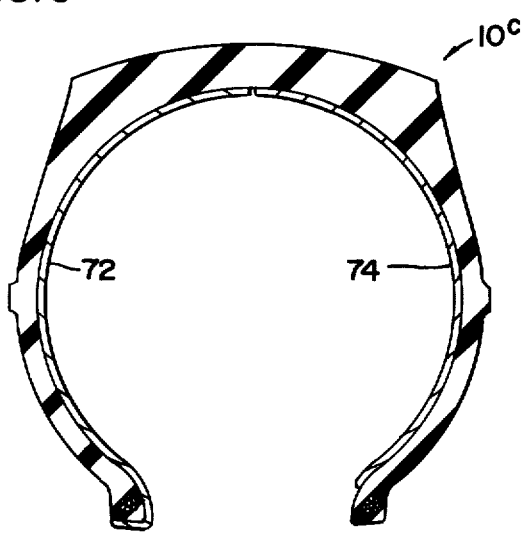
FIG. 6 is a section of a further modification of a tire of the invention.

It is a feature of use of conductive rubber layers 72 and 74 in the tire 10c, indicated in FIG. 6, that the layers can be placed quite closely spaced from each other, for instance, approximately 0.02 inch. Thus, as heat builds up in the tire, the layers 72 and 74 will expand and contact each other to close the electrical circuit when used in the operative tire assembly as shown, for example, in FIG. 4. To insure further expansion of the layers 72 and 74, while they can be made from any suitable conductive thermoplastic coating material, such as an electrical conductive rubber layer, the expansion will occur more distinctly and positively in the layers if formed from a sponge or closed cell foam conductive rubber sheet. These sheets can be somewhat thicker than the layers 18a and 18b, and for example, can be about one-eighth inch in thickness. Hence, as heat builds up in such rubber layers, as shown in FIG. 6, the gases trapped in the pockets of this closed cell sponge will expand and cause the gap between the layers 72 and 74 to close and trigger the warning device when the tire is positioned in the operative assembly of the invention. Any suitable synthetic rubber or rubber-like material or natural rubber can be used in making such layers.

The construction shown in FIG. 6 will have the further function that on cooling, the layers 72 and 74 would separate from each other and the tire can be reused without any dismounting of the tire.

Figure 7:
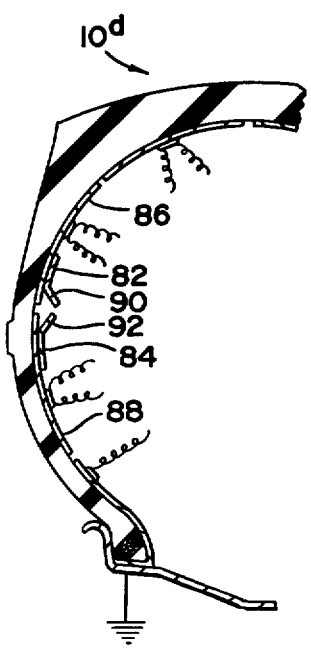
FIG. 7 is a fragmentary section of yet another modified tire of the invention.

FIG. 7 shows a further modification where under inflation can trigger a tire warning system. A tire 10d is shown and it is very similar to the tire construction and assembly shown in FIG. 5. In the tire 10d, however, a pair of conductive rubber strips 82 and 84, of known composition, are suitably secured as by adhesive to spaced conductive rings 86 and 88 like the rings 18c' and 18d''' in the tire sidewall. The strips have end portions 90 and 92 molded or shaped to extend generally radially inwardly of the tire to terminate immediately adjacent each other but normally being spaced slightly when the tire is properly inflated. The strips and portions 90 and 92 are stiff enough to remain out of contact when the tire is rotating. But when the tire is under inflated, the tire sidewalls will flex more and bring the portions 90 and 92 into engagement and close the alarm circuit. Such portions 90 and 92 normally are in the part of the sidewall about one-third to two-thirds of the radial length of the tire sidewall which will flex most when the tire is under inflated. Under inflation for deflection of the tire sidewall under load conditions for the purposes of the invention could be, for example, from about 15 or 20 percent to about 40 to 60 percent or more. A warning would be provided for certain if the tire is about 50 percent under inflated but on reinflation the portions 90 and 92 would separate and it is not necessary to dismount the tire.

The layer 18 can be formed without use of the metal filings when a conductive carbon black is used in such layer.

It is believed that the invention has provided novel and improved pneumatic tires and particularly tires which can be used very readily in warning systems so that the vehicle driver can be notified when a destructive heat buildup situation is being created in a tire. Hence, preventative action can be taken and accidents and damage can be prevented. The method of the invention is relatively easily practiced and the invention provides several alternative methods and structures by which an electrical circuit closing action can be triggered by heat buildup in a tire to provide a warning to the vehicle driver. This, an improved safety action is readily obtained from the invention and improved vehicle operation and safety of operation can be achieved.

While several complete embodiments of the invention have been disclosed herein, it will be appreciated that modification of these particular embodiments of the invention may be resorted to without departing from the scope of the invention.

What is claimed is:

1. A method of making a heat detecting tire comprising the steps of
   applying a removable band forming member to a tire to extend around the tire periphery at about the center of the inner surface thereof,
   applying a liquid coating of a heat sensitive electrically conductive plastic material adapted to melt in the range of from about 250° F. to about 300° F. over the entire inner surface of the tire, and the member thereon, the coating setting to form a conductive film on the tire surface, and
   removing the band forming member to leave two separate laterally spaced annular bands of the plastic material on the tire for use in forming a conductive circuit in the tire when in operative condition and subjected to excessive heat build up in the tire.

2. The method as in claim 1 and including placing a removable member over one bead area of the tire,
   coating both bead areas of the tire with the coating material, and
   removing such bead covering member to make such one bead area of the tire non-conductive.

3. In a vehicle, a pneumatic tire heat detecting system and/or low pressure warning system including a tire, a metal wheel positioning the tire, an axle means rotatably supporting the wheel thereon and including the improvement of
   said tire having a conductive layer on its inner surface and operatively connecting to said wheel at one bead area of said tire, said layer having a narrow annular interruption therein at one area of the tire,
   means grounding said wheel,
   conductive means connecting to said layer adjacent the other bead area of said tire and protruding from the wheel in insulated relation thereto, and
   warning circuit means including a rotary connection means connecting to said conductive means to provide a warning signal and indicate improper conditions in said tire when the spaced portions of said layer are brought into contact.

4. In a system as in claim 3 where said layer is heat sensitive and excessive heat conditions in said tire are indicated when said layer melts or softens and flows over said interrupted portion of the tire surface to complete an electrical circuit.

5. In a system as in claim 4 where the material forming said layer will melt or soften at a temperature of from about 250°F. to about 300°F.

6. In a system as in claim 3 where said conductive means terminates in a spring device and said circuit means includes a fixed contact on the vehicle for engaging the spring device with each rotation of the wheel.

7. A heat detecting and/or low pressure warning tire comprising a pneumatic tire characterized by a coating or layer of an electrically conductive material being positioned on the inner surface of the tire except for at least one annular interruption of such layer to form two separate laterally spaced annular bands of the material on the tire for use in forming a conductive circuit in the tire when in operative condition and subjected to unusual operating conditions.

8. A pneumatic tire as in claim 7 where two of such bands are provided and each is heat sensitive and made from a material adapted to soften or melt at a temperature of from about 250°F. to about 300°F.

9. A pneumatic tire as in claim 8 where two of said bands are provided and one of said annular bands covers one bead of the tire and the other of said bands does not extend to the other tire bead and it has an electrical conductor secured thereto which protrudes from the tire, and said material forming said bands will soften and flow into contact at elevated temperatures.

10. A pneumatic tire as in claim 7 where said annular bands are made from a rubber material and the bands are spaced only a very short distance apart for contacting each other under abnormally high heat conditions in the tire.

11. A pneumatic tire as in claim 8 characterized by a plurality of pairs of separate laterally spaced concentric annular bands of the conductive material on the tire at different radial areas of the tire, and means electrically connecting corresponding bands of each pair together.

12. A pneumatic tire as in claim 7 where a gap exists between two adjacent bands in a sidewall area of the tire, and an individual conductive rubber strip is secured to each of said bands, each of said strips having an end portion protruding at an obtuse angle inwardly of the tire toward the other strip end portion to terminate immediately thereadjacent but spaced therefrom when the tire is properly inflated but which contact when the tire is under inflated under load.

* * * * *